United States Patent [19]
Ternes et al.

[11] Patent Number: 5,255,052
[45] Date of Patent: Oct. 19, 1993

[54] IMAGE CONTROL BOARD

[75] Inventors: James N. Ternes, Roseville; Willard J. Harder, Eden Prairie, both of Minn.

[73] Assignee: Ternes Register System, St. Paul, Minn.

[21] Appl. No.: 933,483

[22] Filed: Aug. 21, 1992

[51] Int. Cl.⁵ ............................................. G03B 27/20
[52] U.S. Cl. ........................................ 355/91; 355/85; 33/621
[58] Field of Search ....................... 355/79, 85, 91, 93, 355/94, 99; 33/621

[56] References Cited

U.S. PATENT DOCUMENTS

| | | | |
|---|---|---|---|
| 3,634,009 | 1/1972 | Van Dusen et al. | 355/93 |
| 4,382,676 | 5/1983 | Ohta et al. | 355/75 |
| 4,636,067 | 1/1987 | Richards, Sr. | 355/91 |
| 4,664,511 | 5/1987 | Carlson et al. | 355/91 |
| 4,977,683 | 12/1990 | Harder | 33/621 |

*Primary Examiner*—Richard A. Wintercorn
*Attorney, Agent, or Firm*—Douglas L. Tschida

[57] ABSTRACT

An imaging support assembly for precise and repeatable alignment and registration of plural, planar workpieces having a plurality of projecting registration pin assemblies. The workpieces contain holes where projecting pins of the registration pin assemblies are received. At least one of the registration pin assemblies contains a projecting pin of a non-circular shape when viewed end-on. A flanged barrel of the assembly is rigidly mounted to a planar support board. The projecting pin is spring biased within a sleeve that mounts in the barrel. The pin projects through a barrel aperture and is non-rotatively movable in the plane of the board within limits defined by the barrel aperture.

14 Claims, 5 Drawing Sheets

IMAGE CONTROL BOARD

BACKGROUND OF THE INVENTION

The present invention relates broadly to the precise registration and alignment of two or more planar workpieces with respect to each other. In particular, the invention relates to a control board used to support a photosensitive lithographic plate and one or more duping film overlays relative to a light exposure assembly, whereby images are formed on the plate, and wherein proper registration of the plate to the overlays is critical to image clarity and definition.

Each exposure is performed in a vacuum frame. The lithographic plate and film overlays are provided with registration holes which are punched at identical spacings and hole configurations to ensure uniformity. The lithographic plate and films are placed on the image control board at registration pins which align the plate and films to one another and the vacuum frame. A glass plate of the vacuum frame covers the lithographic plate and films. A rubber diaphragm in the vacuum frame compresses the film, lithographic plate, and image control board against the glass plate.

In the prior art, the contacting of the film with the plate often times caused the registration pin to distort the film around the pin hole with consequent buckling of the film and loss of registration. For multi-color printing applications, proper alignment and registration versus misalignment is commonly determined by registration to a few thousandths of an inch. Thus, any buckling or non-conformity between the plate and films can result in unusable plates or press runs.

An early attempt to prevent the loss of registration was the use of discreet spring loaded, retractable pins. These pins were loosely positioned on the support cushion beneath the plate and film overlays and were subject to canting.

Also known in the prior art are image control boards that are formed of a rigid material, for example, acrylic plastic sheets. Multiple registration pins are secured to these boards in fixed mountings and are positioned to tolerances of a few thousandths of an inch. However, the differing thermal properties of the components of these boards which, for example, are made of steel, stainless steel, brass, aluminum and acrylic plastic, can effect pin alignment to varying degrees.

A solution to the latter problem is proposed in U.S. Pat. No. 4,977,683. There registration pin assemblies are provided that can be manipulated in a laminated board in a multidirectional fashion within the plane of the board to maintain precise and repetitive registration of the lithographic plate and film overlays, while maintaining planarity with the glass plate. The projecting pins are also rotatively mounted within a barrel shaped support of each assembly.

A problem which has been encountered with the latter pins is that the tolerances of the pins and their mountings to the image control board can require extraneous interventions by the vacuum frame operator, before proper registration is achieved. In particular, one or more of the pins can exhibit a preferential, positional alignment, such that each pin must be properly rotated to a particular position before registration is achieved between all pins, the plate and film overlays. Repeated accessing and repositioning of the films, in turn, can waste time and can result in damage to the film overlays.

SUMMARY OF THE INVENTION

The present invention accordingly provides an imaging support board which enables a precise registration and alignment of a plurality of planar work pieces to the board and wherein each workpiece contains one or more punched registration holes. A planar board member is particularly provided which contains a plurality of spring biased registration pins that project from the board. The punched holes of the planar workpieces are aligned on the board with the registration pins. A means is provided for mounting at least one registration pin assembly in fixed relation to the plane of the board. A non-circular shaped pin projects from the assembly and is non-rotatively moveable within the assembly to obtain precise registration and alignment.

In a presently preferred construction, the board includes three planar board members or laminates that each contain a plurality of holes which receive separate registration pin assemblies. The holes are aligned with each other and disposed along an axis generally parallel to an edge of the board. Retractable pin assemblies are received within the aligned holes. Ones of the pin assemblies may be mounted to permit multidirectional movement of those pin assemblies within the holes of the board. Ones of the projecting pins may also be rotatable within its assembly.

At least one of the pin assemblies, however, has a projecting pin of non-circular shape, when viewed end on, which is rigidly mounted to the board. The projecting pin is non rotatively moveable within the assembly and within the plane of the board and is retractable such that no binding or buckling of the film overlays occurs at the pin holes or which requires repeated accessings of the lithographic plate and film to establish registration.

The non-rotating pin assembly provides a barrel having a flanged shoulder and a body diameter which is slightly smaller than the diameter of the holes in the board. The diameter of the flanged shoulder is greater than the diameter of the holes in adjacent upper and lower laminates and is rigidly sandwiched between these laminates. The barrel is thus rigidly and non-rotatively retained in the board.

A pin projects from the barrel which pin has a non-circular shape, when viewed end-on. The pin is slidably mounted in a sleeve and is spring biased to project from the sleeve. The sleeve and projecting pin are retained to the barrel with the pin projecting from an end aperture of the barrel. The barrel aperture is sized and shaped to prevent rotation of the pin, yet permits multi-directional movement of the pin within a gap space provided at the barrel. When a vacuum is drawn, as in the prior art, the glass plate covering the lithographic plate and film forces the projecting members to retract within the barrel.

These and other objects and advantages of the present invention will become more apparent upon reference to the following detailed description of a presently preferred construction, accompanying drawings and claims.

DETAILED DESCRIPTION OF THE INVENTION

Figure 1:
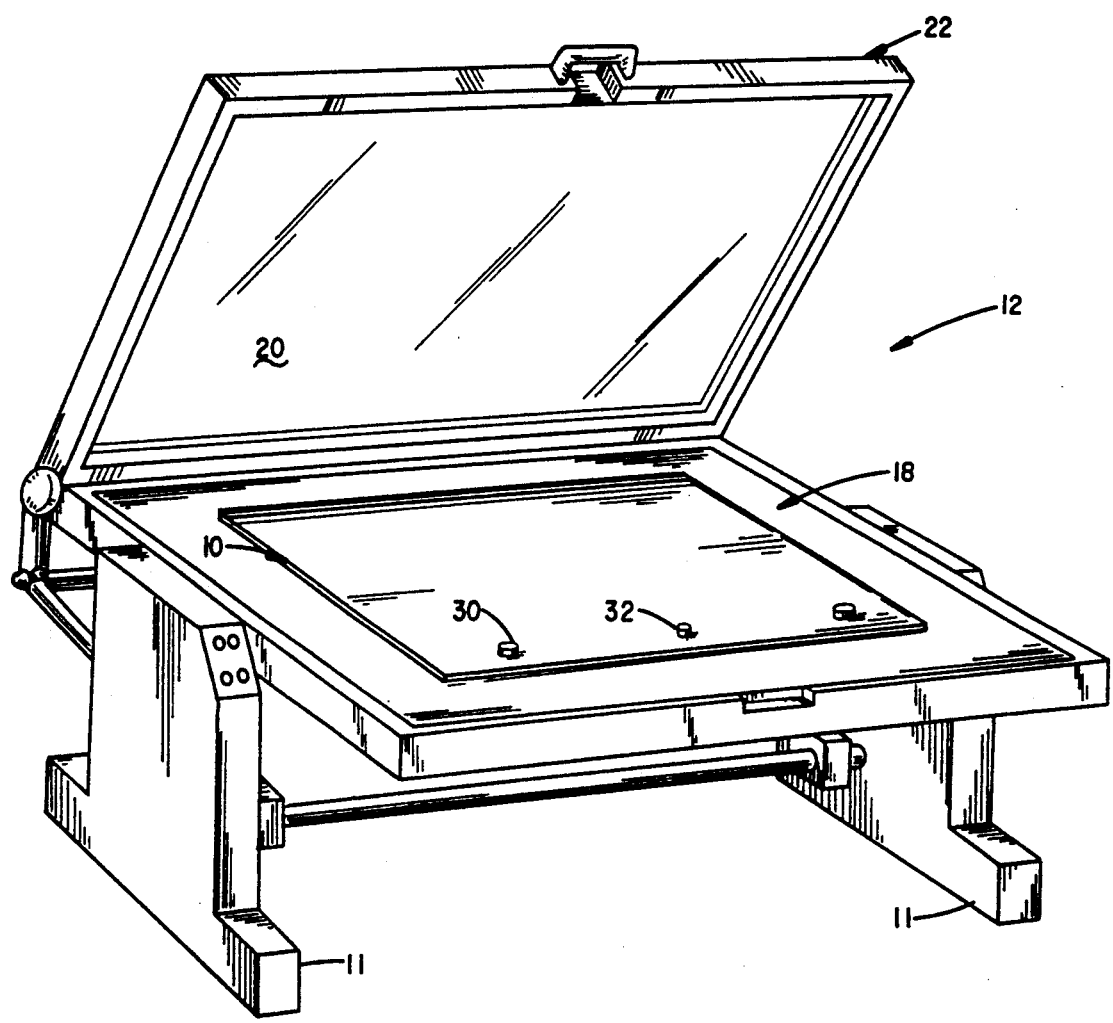
FIG. 1 is a perspective drawing of a vacuum frame that is used with the image control board of the invention.
Figure 2:
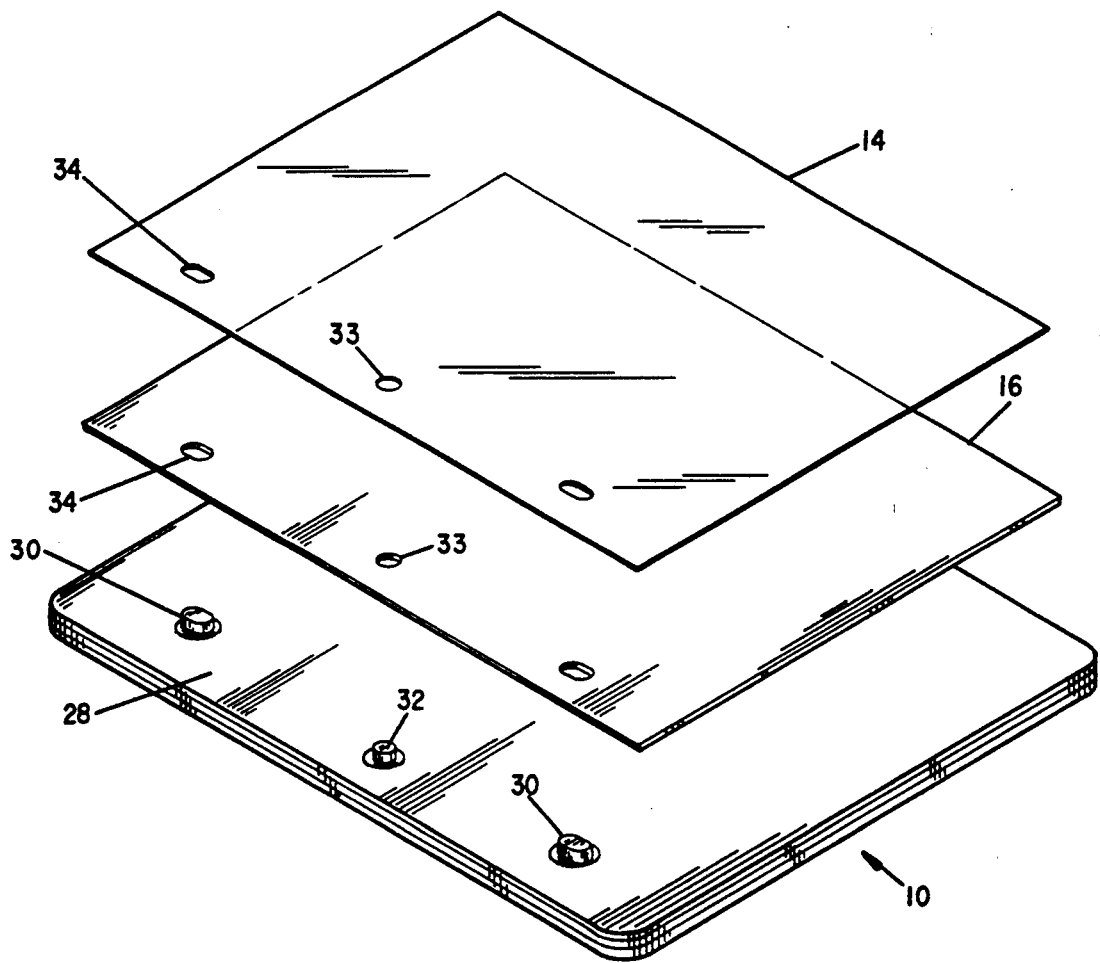
FIG. 2 is a perspective drawing shown in exploded view of the use of the present invention.

Referring to the drawings, FIGS. 1 and 2 illustrate the normal use of the improved image control board 10 of the present invention. That is, the board 10 is normally contained within a vacuum frame 12 shown at FIG. 1 and is used to support one or more sequentially mounted film overlays 14 in registration to a lithographic plate 16. One or more exposed plates 16, in turn, are used to create a multi-color, printed image when the plates 16 are mounted to an appropriate printing press (not shown).

The board 10 is particularly supported on a rubber diaphragm 18 of the frame 12. The films 14 are placed on the lithographic plate 16 and covered over with a glass plate 20 of a cover 22. The board 10, film 14 and plate 16 are thus resiliently yet immovably supported within the vacuum frame 12 upon drawing the board 10 tightly against the glass plate 20 and with the application of a vacuum to the interior of the frame 12.

The film 14 is then exposed to a light source to generate an image on the lithographic plate 16, which alternatively may comprise a so called contact or dup film. In making a multicolor printed image, the importance of precise alignment and registration of each of a number of film overlays should be readily apparent.

Figure 3:
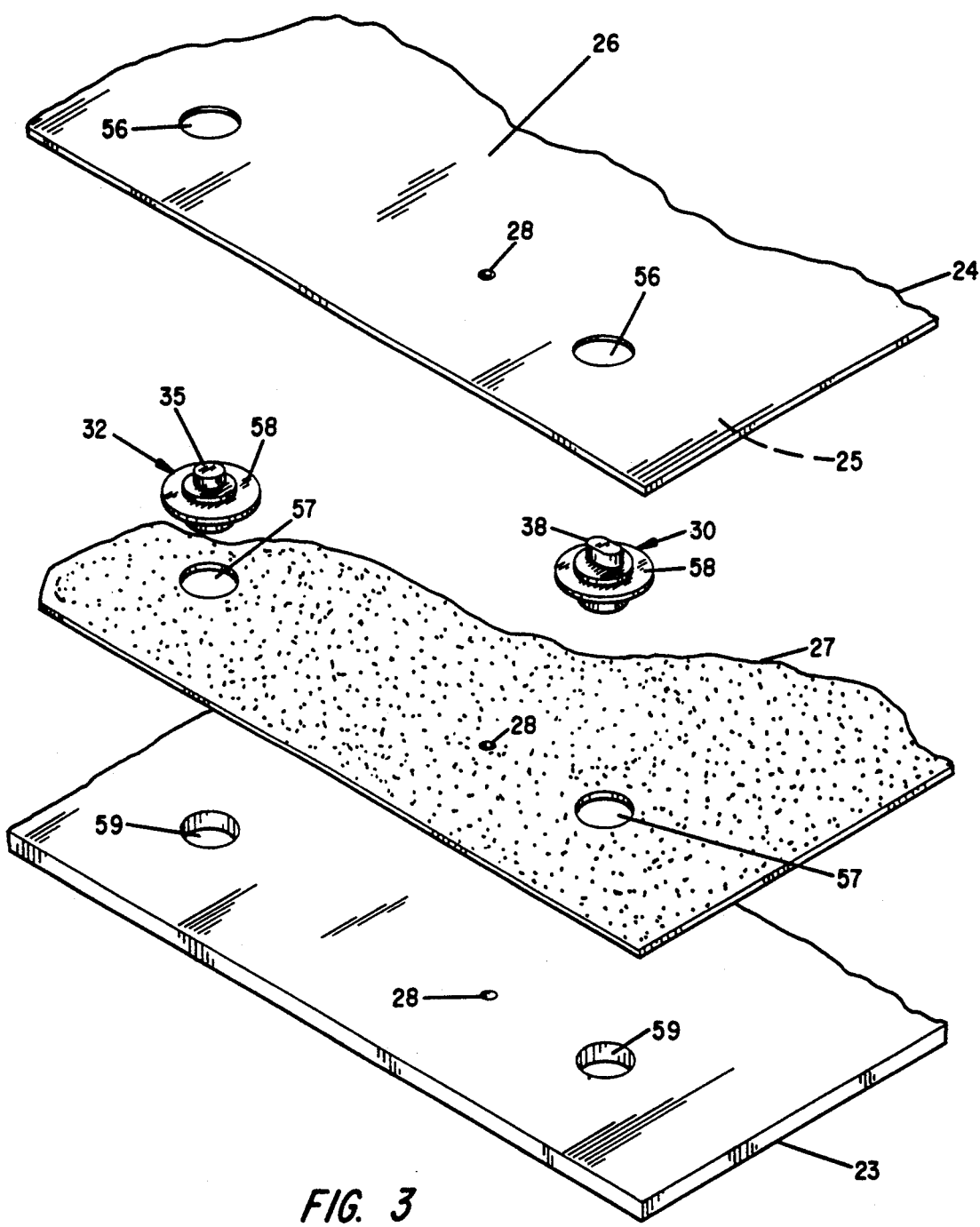
FIG. 3 is a perspective drawing shown in partial exploded view of the registration board of the present invention.

Referring next to FIG. 3, an exploded assembly drawing is shown of the image control board 10. The board 10 includes a first planar member or base layer 23 which is made from an aerated or foamed plastic material sold under the brandname SINTRA. The base 23 is approximately 3 mm or 0.118 inches thick. The board 10 includes a second planar member or top layer 24 which is made from a polyvinylchloride (pvc) sheeting. The underside 25 of the top layer 24 may be polished and its top or exposed surface 26 is textured. The top layer 24 is approximately 0.040 inches in thickness. The texture of exposed surface 26 is such that air passages exist which provide for a more efficient and quicker exhaustion of air between the top layer 24 and the lithographic plate 16 upon the application of a vacuum to the vacuum frame 12.

Mounted between the top and base layers 24 and 23 is an intermediate planar member 27 which is constructed of an open cell foam that is both resilient and flexible. The top layer 24, base 23 and intermediate layer 27 are laminated together by means of a suitable adhesive applied on their adjoining surfaces. Each of top layer 24, base 23 and intermediate layer 27 has two small holes 28 (only one of which is shown) along one edge that are used for registering pins (not shown) when the three layers are being assembled. The peripheral edges of the board 10 are rounded so that no sharp creases are placed in the rubber diaphragm 18 when a vacuum is applied to the vacuum frame 12.

While the present invention contemplates registration boards containing any number of registration pin assemblies, for the embodiment shown in the drawings and for the purpose of illustration, three registration pin assemblies 30 and 32 are disposed along an edge of the board 10. The pin assemblies 30 are of identical construction and are received within holes 34 that are punched in the lithographic plate 16 and film 14. The pin assembly 32 is received in holes 33. The pin assemblies 30 exhibit elongated, semi-rectangular shapes, while the pin assembly 32 exhibits a circular shape, when viewed end-on and from above. The pin assemblies 30 and 32 are spaced apart along a line generally parallel to an edge of board 10. The pin assemblies 30 and 32 are mounted in fixed relation to the board 10 and are retractable. The projecting pin 35 of the pin assembly 32 can be rotated within the assembly. The projecting pin of each pin assembly 30 cannot be rotated, although has a certain degree of freedom of movement described below.

In lieu of a rigid mount, the assembly 32 can also be mounted to the board 10 to permit lateral movement of the assembly in any direction in the plane of the board 10. More of the details of such a pin assembly 32 can be obtained upon reference to U.S. Pat. No. 4,977,683.

Figure 4:
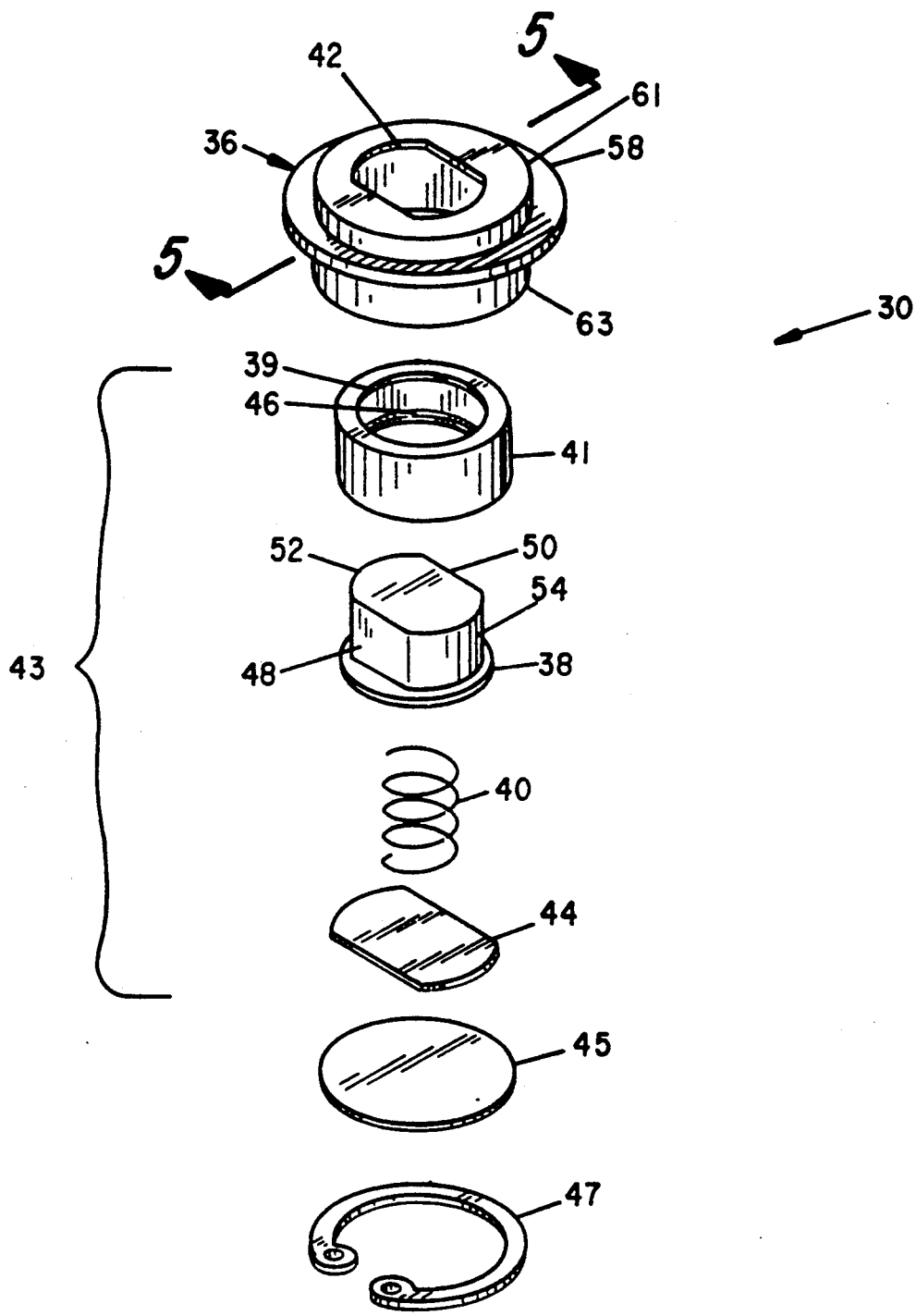
FIG. 4 is a perspective drawing shown in exploded view of one of the registration pin assemblies used in the board of the present invention.
Figure 5:
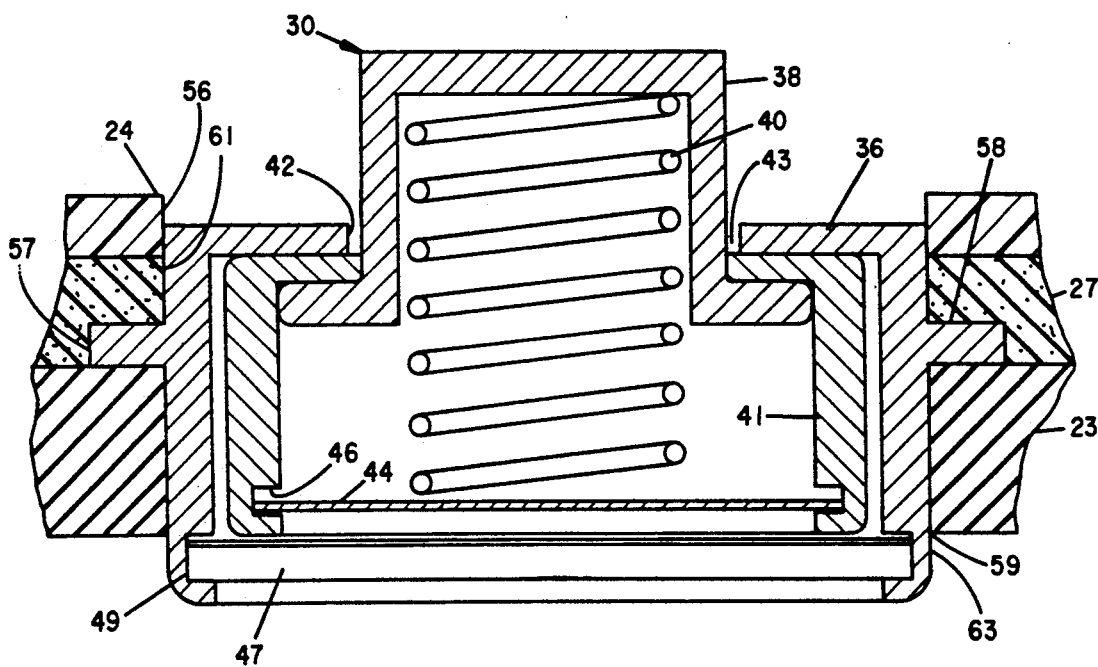
FIG. 5 is a cross section view taken generally along the lines 5—5 of FIG. 1.

With attention to FIGS. 4 and 5, a discussion of the structure of the pin assemblies 30 follows. Each pin assembly 30 is identical and includes a machined barrel 36 and within which a projecting pin member 38 is retractably mounted. The pin member 38 is biased within a sleeve assembly 43 by a coil spring 40. The pin member 38 extends through an opening 39 in a sleeve retainer 41 and an end aperture 42 in the barrel 36 to project above the top layer 24 of the board 10. The spring 40 is retained within the sleeve 41 by a stainless steel plate 44. The plate 44 is snapped or restrained into a groove 46 formed on an inner surface of the sleeve 41. The sleeve assembly 43, otherwise, is retained within the barrel 36 via a disk support 45 and a snap ring 47 that mounts in a groove 49 on the inside of barrel 36. The piece parts of the sleeve assembly 43 and each pin assembly 30 can be repaired or replaced upon removal of the snap ring 47 and plate 44. Under a vacuum, the glass plate 20 of FIG. 1 forces the projecting pin member 38 into a retracted position within the barrel 36 and sleeve 41 against the biasing force of coil spring 40.

Where the projecting pin member 35 of the center pin assembly 32 is generally cylindrical, the projecting pin members 38 each have a pair of flat oppositely disposed surfaces 48 and 50 and a pair of curved oppositely disposed surfaces 52 and 54. The surfaces 48, 50 and 52, 54 prevent the pin 38 from rotating within the end aperture 42 of the barrel 36, which aperture is oversized to permit non-rotational movement of the pin 38 within the hole 42. A plus/minus movement of 0.010 to 0.012 inches from center is particularly provided between the pin surfaces 48, 50 and 52, 54 and the edges of hole 42 at a gap 43.

Holes 56, 57 and 59 are respectively provided in the top, intermediate and base layers 24, 27 and 23 for receiving the barrel 36 of the pin assemblies 30 and 32. The diameter of the holes 56 are substantially the same as the diameter of an upper cylindrical portion 61 of the barrel 36. The diameter of the holes 57 are sized to receive an annular flange 58 which projects from the barrel 36 and the holes 59 are sized to receive a lower cylindrical portion 63 of the barrel 36. The flange 58 prevents the pin assemblies 30 and 32 from falling out of the board 10.

In operation the retractable movement of the pins 30 and 32 allow the lithographic plate 16 and films 14 to compress with contact to the glass 20. Thermal expansion of board 10 caused by temperature changes, otherwise, poses no problem due to the floating pin construction. Moreover, any preferential alignment requirement defined by the holes 33, 34 punched in the plural workpieces (i.e., plate 16 and film 14 or multiple films 14) is accommodated through the lateral movement capabilities of the pin assemblies 30. While various shapes may be used for the pins 38, the elongated flat surfaces 48 and 50 and curved surfaces 52 and 54 taken with the gap 43, provides the advantage of accommodating some longitudinal expansion without buckling the film.

In practice, once lithographic plate 16 is placed over the pin assemblies 30 and 32, the pin assemblies are caused to be in perfect alignment, even if the plate 12 has some lateral movement relative to ones of the pin assemblies. Consequently, when the films 14 are next placed over the pin assemblies 30 and 32 and the lithographic plate 16, the same alignment remains. Since the pins 38 are maintained in a fixed relationship to the plate 16, the films 14 cannot move with respect to lithographic plate 16 even though the films 14, plate 16, and pin assemblies 30 and 32 might be able to move together laterally or vertically a slight amount relative to underlying board 10.

While the present invention finds particular advantage in an image control board for lithographic plate formation, the floating pin concept has application in other disciplines where precise and repeatable registration of work pieces is essential. While too the invention has been described with respect to a preferred construction, it is to be appreciated other equivalent constructions may suggest themselves to those skilled in the art. The invention should accordingly be interpreted within the spirit and scope of the following claims.

What is claimed is:

1. A board providing precise registration and alignment of a plurality of planar work pieces each having a plurality of registration holes therein comprising:
   a. a planar board member;
   b. a plurality of pins mounted on said board and each pin projecting from said board along a pin axis perpendicular to said board, said pins adapted to be received within the registration holes of the work pieces; and
   c. mounting means for securing at least one of said pins for multidirectional movement in the plane of the board while retaining said pin axis perpendicular to said board to ensure registration and alignment of the multiple work pieces with respect to each other, wherein a barrel having an end aperture is rigidly secured to said board, wherein said pin exhibits a non-circular shape when viewed end-on along said pin axis, and wherein said pin is mounted in said barrel to project through said end aperture yet permit non-rotational movement of said pin in said barrel and in the plane of the board.

2. A board in accordance with claim 1 wherein said planar board member further comprises first and second substantially rigid board members adhered together and having a plurality of aligned holes in which said pins are received and wherein the barrel of said mounting means further comprises a flange which radially projects from a body and said flange is rigidly sandwiched between said first and second planar members.

3. A board providing precise registration and alignment of a plurality of planar work pieces each having a plurality or registration holes therein comprising:
   a. a planar board;
   b. a plurality of self-contained spring biased retractable pins mounted on said board, said pins adapted to be received within the registration holes of the work pieces, wherein each of said pins includes a barrel having an end aperture, wherein said pin exhibits a non-circular shape when viewed end-on along said pin axis, and wherein each of said pins is mounted in said barrel to project through said end aperture yet permit non-rotational movement of said pin in said barrel and in the plane of the board; and
   c. means for rigidly securing each barrel to said board.

4. A board in accordance with claim 3 wherein each of said spring biased retractable pins further comprise:
   a. a sleeve having an end aperture;
   b. a pin member mounted for axial movement within said sleeve;
   c. spring means within said sleeve for biasing said pin member toward an extended position projecting from said sleeve; and
   d. means for removably mounting said sleeve within said barrel with said pin member projecting from the barrel end aperture.

5. A board providing precise registration and alignment of a plurality of planar work pieces each having a plurality of registration holes therein comprising:
   a. a first planar member;
   b. a second planar member adhered to said first planar member, said first and second planar members each having a plurality of aligned holes; and
   c. a plurality of retractable pins mounted within aligned holes of said first and second planar members, each of said pins projecting through an aperture of a barrel and adapted to be received within an aligned hole pair in said first and second planar members and having a barrel diameter substantially the same as the diameter of said aligned hole pair, a radially extending flange fixed to said barrel and a diameter of said flange being greater than the diameter of said aligned hole pair and said flange being sandwiched between said first and second planar members, wherein ones of said pins exhibit a non-circular shape when viewed end-on along a pin axis perpendicular to said first and second planar members, and wherein said non-circular pins are mounted in said barrel to permit non-rotational movement of said non-circular pins said barrel in the plane of the board.

6. A board in accordance with claim 5 wherein a plurality of said aligned hole pairs in said first and second planar members are disposed along a line generally parallel to and proximate an edge of said board and further comprising a fixed pin mounted in at least one of said aligned hole pairs which fixed pin is rotatable in the plane of said board.

7. An image control board providing precise registration and alignment of a plurality of films on a lithographic plate, the plate and films having alignment holes therein, comprising:
   a. first and second planar members adhered together and having a plurality of holes spaced apart along a line generally parallel to an edge of said planar members;

b. a first pin rotatively mounted in at least one of said holes;

c. at least one pin mounted within at least one of said other of said holes, said at least one pin comprising a barrel having an end aperture and a diameter substantially the same as the diameter of said at least one of said other of said holes, a projecting pin member mounted within a sleeve, means for retaining said sleeve in said barrel, spring means within said sleeve for biasing said projecting pin member in an extended position projecting from said sleeve and said barrel, and a flange radially projecting from said barrel and having a diameter greater than the diameter of said at least one of said other of said holes, said flange and barrel being rigidly sandwiched between said first and second planar members and wherein said pin non-rotatively rotatively projects from the end aperture of the barrel and is movable in the barrel in the plane of the board.

8. An image control board in accordance with claim 7, wherein said pin projects above a textured surface of said first planar member and an opposite surface of the first planar member in contact with said flange is smooth.

9. An image control board in accordance with claim 8, further comprising a third planar member sandwiched between said first and second planar members and having a plurality of holes aligned with the holes in said first and second planar members and within which holes said flange of each of said pins is received.

10. An image control board in accordance with claim 9, wherein said first planar member is an aerated plastic, said second planar member is a polyvinylchloride material, and said third planar member is an open cell foam material.

11. A board providing precise registration and alignment of planar work pieces, each work piece having a plurality of registration holes therein, comprising:

a. first and second substantially rigid board members adhered together and having a plurality of aligned holes;

b. a plurality of pins mounted on said board members and received within said holes and projecting from said board members along a pin axis perpendicular to said board members, said pins adapted to be received within the registration holes of the work pieces; and c. mounting means for securing at least one of said pins for multidirectional movement in the plane of the board members while retaining said pin axis perpendicular to said board members to ensure registration and alignment of the multiple work pieces with respect to each other, wherein a barrel having an end aperture is rigidly secured to said board members, wherein said pin exhibits a non-circular shape when viewed end-on along the pin axis, and wherein said pin is mounted in said barrel to project through said end aperture yet permit non-rotational movement of said pin in the plane of the board.

12. A board in accordance with claim 11 wherein said mounting means includes a flange radially extending from said barrel and wherein said flange is sandwiched between said first and second board members.

13. A floating pin adapted to be mounted on a board in a manner to permit multidirectional movement of the pin in the plane of the board comprising:

a. a barrel having an end aperture;

b. a sleeve having an end aperture;

c. a pin member slidably received within said sleeve and projecting from said sleeve and barrel;

d. spring means for urging said pin member into an extended position projecting through the end apertures of said sleeve and barrel;

e. means for retaining said spring means and said projecting pin member in said sleeve and said sleeve within said barrel; and f. wherein said pin member is non-rotationally movable in the end aperture of the barrel in the plane of the board.

14. A floating pin in accordance with claim 13 wherein said retaining means includes a first plate removably received within a groove on the inner surface of said sleeve for retaining said pin member to said sleeve and a second plate and a snap ring removably received in a groove on the inner surface of said barrel for retaining said sleeve to said barrel.

* * * * *